(12) United States Patent
Riise et al.

(10) Patent No.: US 8,640,879 B2
(45) Date of Patent: Feb. 4, 2014

(54) INCLINED CHUTE SORTER

(75) Inventors: Brian L. Riise, San Ramon, CA (US);
Ronald C. Rau, Gringley-on-the-Hill (GB); Hyung Baek, Pinole, CA (US);
Pedro Alejandro Perez-Rodriguez, Trujillo Alto, PR (US); Scott A. Farling, San Francisco, CA (US)

(73) Assignee: MBA Polymers, Inc., Richmond, CA (US)

( * ) Notice: Subject to any disclaimer, the term of this patent is extended or adjusted under 35 U.S.C. 154(b) by 5 days.

(21) Appl. No.: 13/433,975

(22) Filed: Mar. 29, 2012

(65) Prior Publication Data

US 2012/0248014 A1 Oct. 4, 2012

Related U.S. Application Data (60) Provisional application No. 61/469,294, filed on Mar. 30, 2011.

(51) Int. Cl.
*B07C 5/00* (2006.01)

(52) U.S. Cl.
USPC .............................. 209/638; 209/637; 209/640

(58) Field of Classification Search
USPC ........................................... 209/637, 638, 640
See application file for complete search history.

(56) References Cited

U.S. PATENT DOCUMENTS

| | | | | |
|---|---|---|---|---|
| 2,304,554 | A | | 12/1942 | Dixon |
| 3,805,953 | A | * | 4/1974 | Jones et al. .................. 209/638 |
| 3,945,915 | A | * | 3/1976 | Wilson ........................ 209/44.1 |
| 4,375,853 | A | * | 3/1983 | Feller et al. .................... 209/640 |
| 5,549,250 | A | * | 8/1996 | Stricker .......................... 241/23 |
| 7,802,685 | B2 | | 9/2010 | Allen et al. |
| 2006/0180522 | A1 | * | 8/2006 | Legtenberg .................. 209/639 |
| 2010/0078362 | A1 | | 4/2010 | Riise et al. |
| 2012/0037546 | A1 | * | 2/2012 | Dixon et al. .................. 209/640 |

FOREIGN PATENT DOCUMENTS

| | | |
|---|---|---|
| DE | 19510923 B4 | 10/1996 |
| DE | 19535296 A1 | 3/1997 |
| DE | 102009031762 A1 | 1/2011 |

OTHER PUBLICATIONS

International Search Report and Written Opinion; Oct. 29, 2012; World Intellectual Property Organization (WIPO) (International Bureau of); PCT/US2012/031255; 11 pages.

\* cited by examiner

*Primary Examiner* — Kaitlin Joerger
(74) *Attorney, Agent, or Firm* — Fish & Richardson P.C.

(57) ABSTRACT

A method of separating a mixture of solid materials includes supplying a stream of a mixture of solid materials to a stationary inclined surface and collecting a plurality of particles at one or more collection ports spaced from and located along the axis of the inclined surface. The mixture of solid materials includes a plurality of particles. The plurality of particles includes rubber particles and plastic particles. The particles of the mixture contact the stationary inclined surface and travel downward along the surface due to gravitational force. The collected particles include a higher percentage of the rubber particles than mixture due to a greater degree of bouncing of the rubber particles due to their higher friction compared with plastic particles. A material sorting apparatus includes a stationary inclined surface, a feeder, and a plurality of collection ports spaced from and located along the axis of the inclined surface.

19 Claims, 4 Drawing Sheets

INCLINED CHUTE SORTER

CROSS-REFERENCE TO RELATED APPLICATIONS

This application claims priority under 35 U.S.C. §119(e)(1), to U.S. Provisional Application Ser. No. 61/469,294 filed on Mar. 30, 2011, the entire contents of which is incorporated herein.

TECHNICAL FIELD

This disclosure relates to material separations, including recycling plastics from streams of waste plastics and other materials.

BACKGROUND

The recovery of plastics from waste streams, such as from durable goods, is a considerable challenge due to the presence of several types of plastics as well as non-plastic contaminants. High purity particles recovered from a recycling process can be extruded and pelletized to make a high quality product. However, such extrusion can be difficult and the quality of the product can be poor unless certain types of contaminants are reduced to very low levels prior to extrusion.

Such problematic contaminants include, among others, non-plastics such as wood, particle board, paper, cardboard, rubber, textiles, metallic coatings, wires and circuit boards. Because such materials do not melt, they can quickly result in a blockage of the melt filtration equipment used during the extrusion step, even when these contaminant materials are present in small amounts. Non-melt particles smaller than the size of screens used in the melt filtration equipment can pass through the melt filtration equipment, but can result in cosmetic and/or mechanical defects in products made out of the recovered plastics. In addition, cellulose-based contaminants (e.g., wood, particle board, cardboard and paper) can start degrading at some typical extrusion temperatures, so dark specks of degraded material can disintegrate from the original contaminant particles and pass through the melt filtration equipment. In addition, some plastics contain coatings such as metallic paint or metal plating that can cause similar difficulties in the extrusion step and in the products from extrusion of recycled plastics.

SUMMARY

In the following, methods, systems, and devices are described for the selective removal of rubber from plastic particles using an improved concept of processing flake mixtures over an inclined surface.

According to a first aspect, a method of separating a mixture of solid materials is described that includes supplying a stream of a mixture of solid materials to a stationary inclined surface such that the particles of said mixture contact the stationary inclined surface and travel downward along the surface due to gravitational force and collecting a plurality of particles at one or more collection ports spaced from and located along the axis of the inclined surface. The mixture includes a plurality of particles. The plurality of particles includes rubber particles and plastic particles. The collected particles include a higher percentage of the rubber particles than the mixture due to a greater degree of bouncing of the rubber particles due to their higher friction compared with plastic particles.

According to another aspect, a material sorting apparatus is described that includes a stationary inclined surface, a feeder adapted to supply a stream of particles to the stationary inclined surface such that the particles tumble down the stationary inclined surface, and a plurality of collection ports spaced from and located along the axis of the inclined surface. The plurality of collection ports are positioned to collect particles that bounce away from the stationary inclined surface.

DETAILED DESCRIPTION

This application describes methods, systems, and devices for separating materials based on differences in their frictional behavior, and how this friction enables higher friction materials to bounce away from sliding surfaces as they gain kinetic energy. For example, the described methods, systems, and devices can be used in a recycling plant for the recovery of plastics from goods containing plastics. These processes can be used at one or more locations in the overall process of separating plastic material from other materials in a recycling plant.

Rubber tends to have a high frictional force against surfaces because it tends to be softer and tackier than thermoplastics and can therefore grab surfaces more effectively than thermoplastics. Because of this property, rubber moving over a surface will tend to tumble and bounce away from the surface rather than slide along the surface as a lower friction material might tend to do. Accordingly, in the following, we describe methods, systems, and devices that use frictional differences to enable the selective removal of rubber from plastic particles.

A recycling plant for the recovery of plastics from durable goods can include a number of process steps. For example, U.S. Pat. No. 7,802,685 describes various sequences of various process steps for the removal of contaminants from a plastics recycle stream. The methods, systems, and devices described herein can be used in sequence with or in substitution of the various process steps described in U.S. Pat. No. 7,802,685, which is hereby incorporated by reference. Theses sequences of processes apply to both streams derived from durable goods and to streams of packaging materials, bottles, or other mixtures rich in plastics.

The process can include the use of one or more size reduction steps performed on a plastics-rich mixture from durable goods. The feed mixture can be shredded material from which some metal has been removed. The durable goods themselves can be reduced in size two or more times prior to extrusion. The size reduction steps may include rotary grinding, a hammermill, shredding, granulation, or any other size reduction processes known by those skilled in the art.

The particles of the mixture can have a variety of dimensions. In some embodiments, the particles can have spherical, cylindrical, flat, and/or cuboidal shapes. Particles can also have a jagged shape. The term "flakes" is sometimes used interchangeably with the term "particles." The particles can range in size from about 1 mm to about 50 mm. In some embodiments, a majority of the particles have a diameter of 25 mm or less. In some embodiments, at least 90% of the particles have a diameter of 25 mm or less. In some embodiments, a majority of the particles have a diameter of 10 mm or less. In some embodiments, at least 90% of the particles have a diameter of 10 mm or less. In some embodiments, 90% of the particles have a diameter of between about 2 mm and about 10 mm. In some embodiments, a majority of the particles have a thickness of between 1 mm and 3 mm. The mixture can be formed by passing particles through a mesh or screen to remove larger particles. In some embodiments, the mixture is formed by passing particles through a screen having square holes having a width and height of about 10 mm.

The mixture rich in plastic particles can be processed through one or more density separation processes. These density separation processes can occur in water at a density cut point of 1.0, or in aqueous salt solutions or aqueous suspensions of solid particles with density cut points greater than 1.0, for example as described in U.S. Pat. No. 7,802,685. The plastic-rich mixture may also contain rubber, wood, and other non-plastics. Size reduction, in some embodiments, can precede the density separation processes. In some embodiments, size reduction can also follow one or more density separation processes to create a mixture having particle sizes of between about 2 mm and about 10 mm.

The density separations may be carried out in any of the types of density separation equipment. For example, hydrocyclones can efficiently separate materials of different densities based on the high centrifugal forces present in the liquid slurry swirling inside a cyclone. An appropriate rinsing step can be used after elevated density separations. The rinsing step may contain, for example, small water jets that are designed to rinse the majority of the salt solution or suspended particles off the materials in the plastic-rich flake mixture. The mixtures can also be dried in a controlled manner after the density separations. Flake materials tend to adhere to surfaces if they are overly damp or wet, and this can result in poor separation performance for some of the processes described herein.

Two product streams can be recovered from each density separation process. One or both of these product streams may be further processed to recover high purity plastics. Each product from the density separation can contain two or more types of plastics and small amounts of non-plastics. Such a product may therefore require further purification steps, as described in U.S. Pat. No. 7,802,685. Purification steps can include processes relying on a narrow surface to mass distribution preceded by surface to mass control operations.

After purification of the plastics by type (and also sometimes grade), the material can be melt compounded. The flake to be melt compounded can be blended prior to extrusion in order to improve product uniformity. The melt compounding step can employ melt filtration equipment to remove most of the non-melt contaminants.

The melt filtration step can leave some non-melt contaminants in the product. This can be due to the fact that there are some non-melt particles smaller than the filtration size and some non-melt particles are able to deform such that they pass through melt filtration equipment. These non-melt particles can be visible in parts molded or otherwise fabricated from the extruded pellets, and large numbers of non-melts can prevent the material from being used in parts requiring a uniform color and appearance. Non-melt particles can also act as stress concentration points, which can reduce mechanical properties such as the impact strength or the elongation at break. The number of non-melt contaminant particles in the product after melt filtration can be lower if there are fewer non-melt contaminant particles in the feed sent to the melt compounding and filtration equipment. In addition, typical melt filtration equipment works best when the portion of non-melt contaminants is fairly low. Melt filtration equipment is quickly clogged when large amounts of non-melt contaminants are present in the melt, and this clogging can result in lower throughput rates, increased operating expenses (due to frequent disposal of used screens, for example) and increased wear on melt filtration equipment. For these reasons, it is important to remove as much non-melt contamination as possible prior to melt compounding.

Separators which exploit differences in magnetic and frictional properties can enable the efficient removal of certain types of contaminants found in plastic-rich streams recovered from durable goods. These methods, systems, and devices can include the use of rotating rollers, disks or other three dimensional objects, or even inclined surfaces, as disclosed in U.S. Patent Application Publication No. 2010/0078362, which is hereby incorporated by reference.

Figure 1:
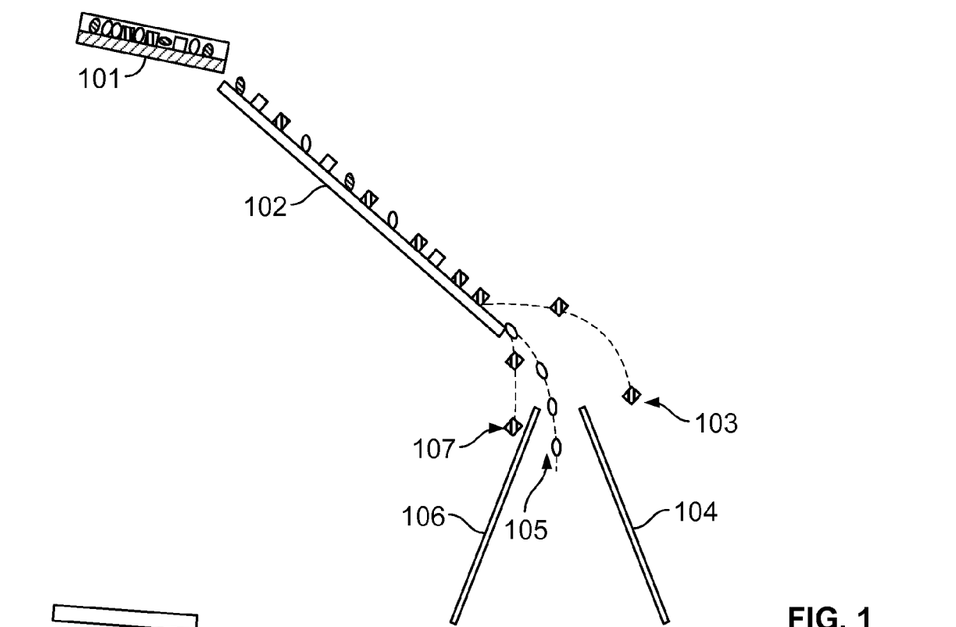
FIG. 1 shows a sliding chute where rubber is separated from plastic based on differences in dynamic friction.

Because of the different frictional characteristics of rubber and plastic, differences in how fast each material type slides down an inclined chute can be exploited. As shown in FIG. 1, lower friction plastic particles (105) slide freely down the chute (102) and leave the chute with a relatively high velocity. Higher friction rubber particles (107) tend to slide more slowly down the chute so they don't travel as far horizontally after leaving the chute. Bulky and high friction rubber pieces can tumble down the chute such that they pick up higher speed and also more horizontal component. These tumbling pieces (103) can travel even farther horizontally than plastic particles when leaving the chute. FIG. 1 schematically shows the trajectories of these materials and how one might include diverter plates (104 and 106) to aid in separating rubber from plastics.

Figure 2:
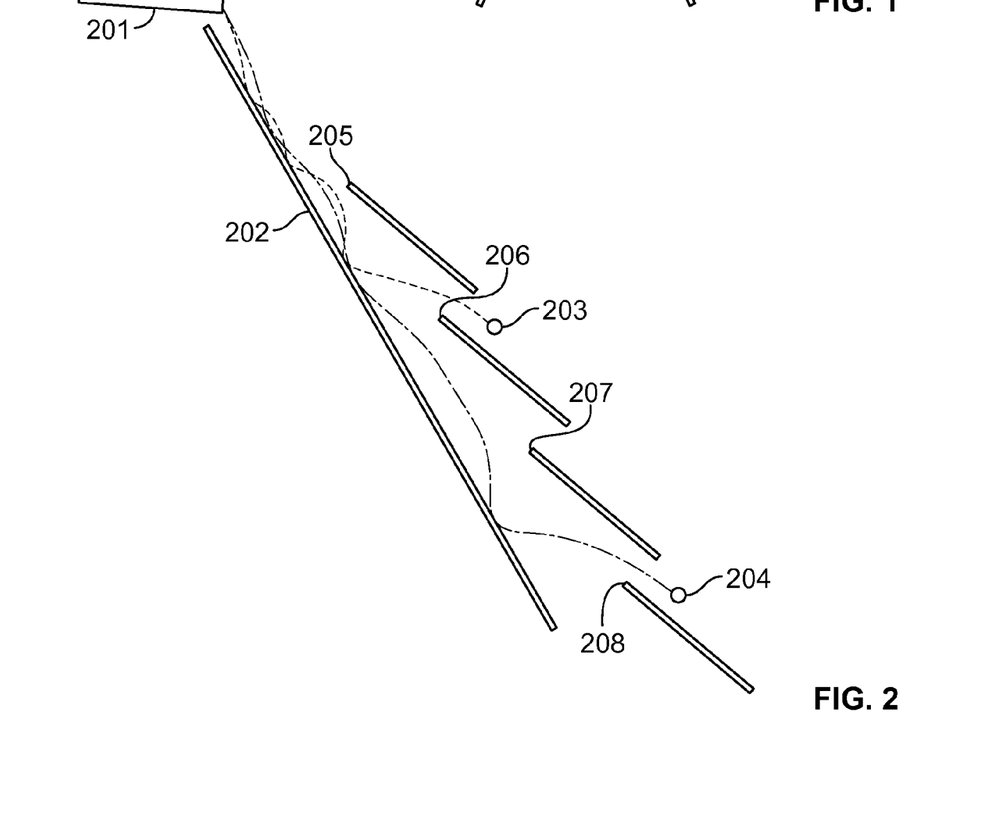
FIG. 2 shows example trajectories of rubber particles tumbling down the inclined chute sorter.

A particular implementation that exploits both frictional properties and the ability of high friction rubber particles to tumble and bounce when they move along a surface is an inclined chute sorter. This sorter can have several collection points placed along the length of the sorter, which enables multiple opportunities for the collection of rubber. This feature is especially useful because the bouncing of rubber is a random event and can thus begin at any point along the chute as the rubber slides and/or tumbles down the chute. FIG. 2 shows example trajectories of rubber particles (203 and 204) and possible positions of collection points (205-208) that can capture the bouncing rubber. Lower friction plastic particles (not shown) would tend to slide down the chute without bouncing so that they are not captured by any of the collection points (205-208).

Figure 3:
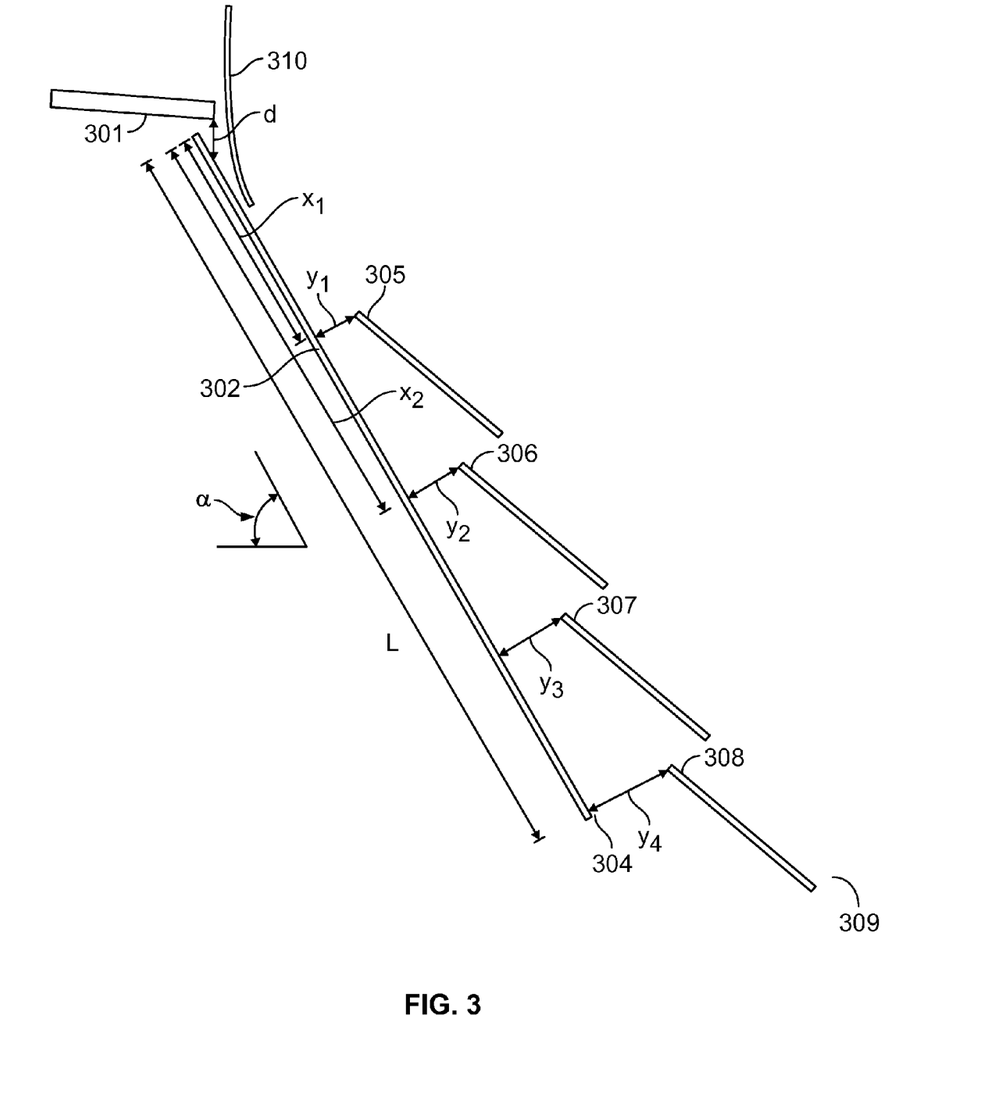
FIG. 3 shows the important dimensions used to describe an inclined chute sorter.

FIG. 3 is a schematic drawing of an inclined chute sorter with four collection points (305-308) along the length of the inclined chute (302). The sorter is fed using a vibratory feeder (301) that uniformly distributes the mixture across the width of the sorter. The plastic-rich stream exiting at the end of the chute (304) includes material that fails to bounce very far from the slide surface, and the rubber-rich stream exiting the sorter (309) includes material that has bounced sufficiently far from the surface to be captured by any of the five collection points (305-308).

The distance d of the vibratory feeder (301) above the point on the inclined chute where the particles fall is typically less than 25 mm, and preferably the distance is less than about 10 mm. Larger drop heights result in bouncing that is not related to the frictional characteristics of each material, so plastic particles are more likely to bounce and report to the rubber-rich stream.

In some implementations, a flexible material (310) is placed above the inclined chute near the location where the mixture enters the sliding chute. The flexible material may be, for example, fabric, coated fabric, a soft rubber sheet or a flexible plastic sheet. The flexible material can dampen any bouncing of materials and thus establish an initial condition free of significant bouncing. This permits rubber to begin tumbling based on its frictional properties and its speed flowing down the chute, rather than any bouncing related to how the material falls onto the chute from the feeder. Plastic particles are thus less likely to bounce and report to the rubber-rich stream.

The angle α of the inclined chute in FIG. 3 can be adjustable or can be fixed at a particular angle. In some embodiments, the angle α of the inclined chute is adjustable between about 50 and about 70 degrees. In other embodiments, the angle α of the inclined chute is fixed at an angle between about 50 and about 70 degrees. For example, the angle α can be set at about 60 degrees. Angles that are too low may not permit the material to slide freely down the chute. Angles greater that are too high may not permit the rubber particles to bounce as well towards the collection points (305-308).

The distances $y_i$ from the inclined chute (302) to each of the collection points (305-308) are process variables that can be controlled to tune the separator for the removal of rubber. Shorter distances $y_i$ can result in more rubber being removed, but short distances may also result in larger amounts of plastic reporting to the rubber-rich stream. Larger distances $y_i$ can result in higher concentrations of rubber in the rubber stream, but the fraction of rubber remaining in the plastic product would be larger than when the collection points (305-308) are closer to the inclined chute (302). The operator can select the distances $y_i$ of the collection points (305-308) to balance the tradeoffs of plastic losses, plastic product quality and rubber purity.

Figure 4:
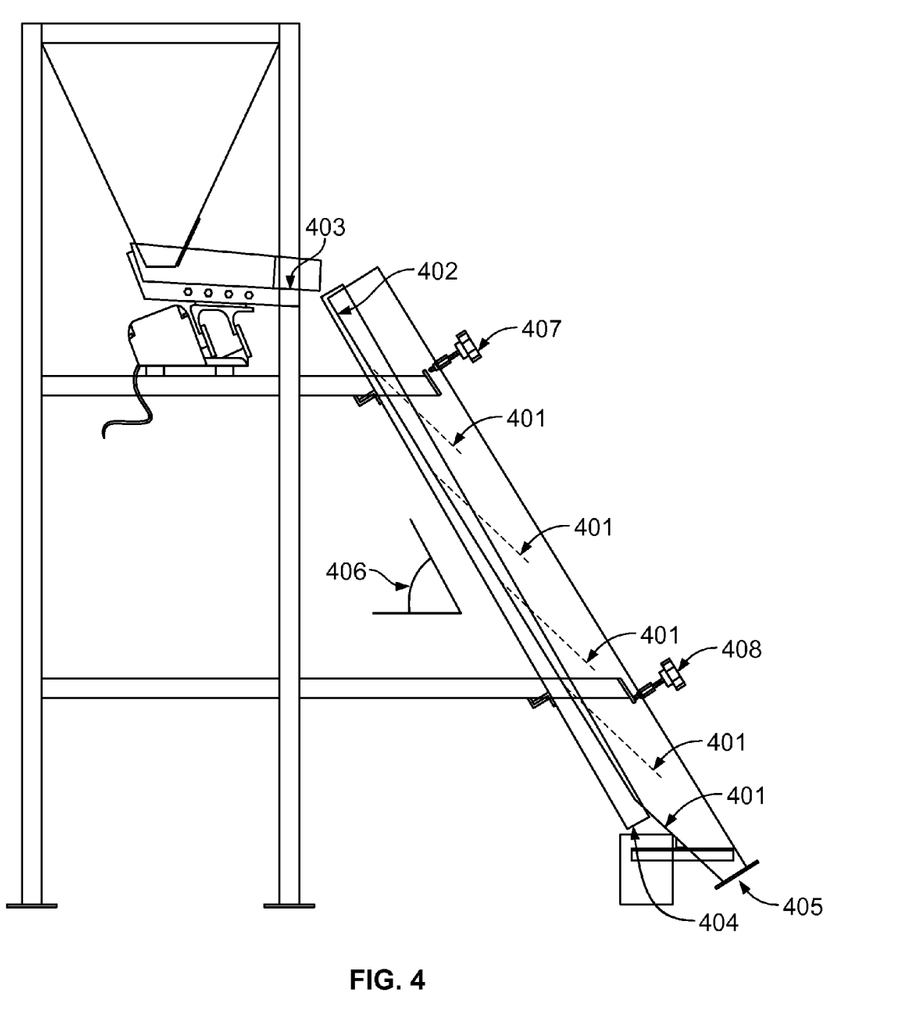
FIG. 4 shows an inclined chute sorter design where rubber is separated from plastic and collected at five collection points along the length of the sorter.

In some implementations, the distances $y_i$ from the collection points (305-308) to the inclined chute (302) vary along the length of the inclined chute. In some cases, the distance $y_i$ can be independently varied for each collection point. In other cases, the collection points are all rigidly affixed to a collector frame and the collector frame is adjusted at the upper and lower ends of the inclined chute sorter. FIG. 4 shows adjustment locations for the upper (407) and lower (408) distances ($y_1$ and $y_5$) from the inclined chute to the collection points when the collection points are affixed to the collector frame.

The distances of the collection points from the inclined chute near the upper end of the sorter can be shorter than the distances of the collection points from the inclined chute near the lower end of the sorter. Distances at the upper end can range from about 10 mm to about 50 mm. Distances at the lower end can range from about 10 mm to about 100 mm. These distances can depend on particle size and on the desired separation performance of the inclined chute sorter. For example, an inclined chute for processing particles smaller than 10 mm can have a distance $y_1$ of the collection point at the upper end (305) from the inclined chute (302) of between about 20 mm and about 30 mm, and a distance $y_4$ of the collection point at the lower end (308) from the inclined chute (302) of between about 30 mm and about 80 mm.

FIG. 4 shows an example of a sliding chute slide sorter with five collection points. Dimensions are shown in millimeters. The spacing from the collection points to the inclined chute's slide surface can be adjusted using the adjustment knobs (407 and 408). The plastic-rich stream (404) includes material that fails to bounce very far from the slide surface, and the rubber-rich stream (405) includes material that has bounced sufficiently far from the surface to be captured by any of the five collection points (401).

The collection points in an inclined chute sorter can be made from metal or plastic strips spanning the width of the sorter. The collection strips should be made sufficiently rigid such that they are even across the width, and are not bowed due to welding stresses or due to sagging or buckling. To add rigidity in some implementations, one end of the strip can be slightly bent prior to attachment onto the collection assembly. The width of each strip should be sufficient to prevent particles from reentering the plastic stream after bouncing past the collector. Each strip can be oriented at an angle slightly lower than that of the chute, but sufficient to allow particles to easily flow down to the rubber-rich product outlet. In some embodiments, the collection strips are angled at an angle of at least 40 degrees with respect to horizontal.

The distance $x_1$ along the inclined chute's sliding surface to the first collection point can vary. In some embodiments, the distance $x_1$ along the inclined chute (302) from the vibratory feeder (301) to the first collection point (305) is at least 15 cm. The distance $x_1$ to the first collection point (305) can ensure that the rubber particles will have enough kinetic energy to bounce into the first collection point (305).

The length L of the inclined chute sorter and the placement of the collection points along the length of the sorter will depend on factors such as the availability of space for the equipment and the size of the particles. The inclined chute's sliding surface can be, for example, between 0.5 and 3 meters in length. Shorter sorters may suffer in performance because they do not enable as many opportunities for collection of rubber. Longer sorters can be somewhat unwieldy and take up larger amounts of space. In some embodiments, the inclined chute sorters are approximately 1.2 meters in length. In some embodiments, the collection points are evenly spaced along the sorter (after an initial section without collection). In other embodiments, the collection points can be spaced at irregular intervals. In some embodiments, the spacing and angles of the collection slats enable all particles bouncing far enough from the surface to enter the collection area and restrict particles from bouncing back into the plastic-rich area closer to the sliding chute.

The material used for the inclined chute's sliding surface can influence the separation performance. In particular, it may be advantageous to use materials for which the difference in dynamic friction coefficients between contaminant particles and plastic particles is largest. Sliding surfaces may be made of standard metals such as carbon steel or stainless steel to simplify construction. They can also be made out of other metals such as aluminum or brass, or they can be made of other non-metallic materials such as plastic, glass, rubber, wood or ceramic. Surfaces can also of course be coated with paints or other surface coatings that may be of particular usefulness for aiding the separation. In some embodiments, the surface is made of plastic (e.g., polycarbonate), glass, or anodized aluminum. Plastic may wear due to the plastic particles scratching the surface and result in a performance that deteriorates over time. Glass can have a more constant performance, but care must be taken when installing, attaching, or removing glass to prevent breakage.

The texture of the sliding surface can also influence the separation performance. Textured surfaces may enhance the frictional drag on materials, and in some cases may enhance the ability of particles to tumble along the friction surface. Such textures can include, but are not limited to, directional grooves cut into the surface, mesh screen material, or perforated plate with holes smaller than the particle sizes.

The temperature of the sliding surface and of the plastic-rich mixture is also important to control in order to best exploit frictional differences. At lower temperatures, materials such as rubber become more rigid, and are therefore less distinguishable from plastics in terms of frictional properties.

Static charge on the particles or on the sliding surfaces can also impact the separation process. Charges on the various particles and surfaces may influence how particles move and may even cause them to stick to charged surfaces. In some embodiments, a conductive and grounded metal sliding surface is used. In some embodiments, antistatic devices such as ion air blowers or air-knives are employed to dissipate charges.

Figure 5:
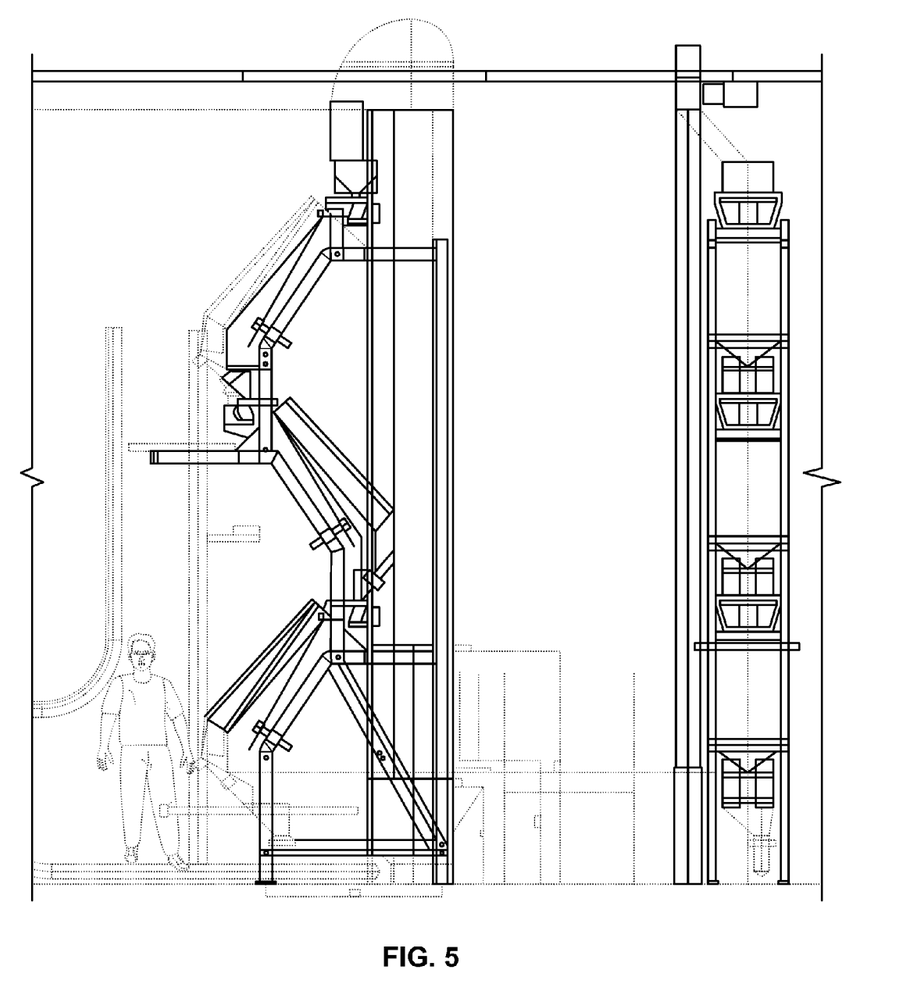
FIG. 5 shows three inclined chute sorters stacked in a series.

The inclined chute sorter can be used in alone or in combination with outer processes. In some embodiments, more than one inclined chute sorters can be arranged in series (either one after another, or with intermediate process steps). An example of stacked inclined chute sorters is shown in FIG. 5. Examples 1 and 2 describe the results from multiple stages of sorting.

Inclined chute sorters can be used to process materials at various stages in the process. Inclined chute sorters work best for mixtures of particles smaller than about 10 mm, but they can also work for mixtures of particles up to about 25 mm. Inclined chute sorters can separate rubber from plastics from a variety of feed mixtures. Such feed mixtures may include, for example, plastic-rich or rubber-rich mixtures derived from waste electronics (WEEE), shredded toner cartridges (STC) and from end of life vehicles (ELV).

Since the performance of inclined chute sorters depends on properties such as the particle size and shape of plastic and rubber particles, it is also useful to sort streams by size or by surface to mass ratio prior to processing with an inclined chute sorter. U.S. Pat. No. 7,802,685 describes various surface-to-mass control operations. It may be advantageous to insert such processes prior to rubber removal using an inclined chute sorter.

In addition to the purification of the plastic product stream, inclined slide sorting equipment can be used to create streams highly enriched in rubber. Such high purity rubber streams can have some positive value, so slide sorters can be tuned to create high purity streams. Alternatively, the rubber-enriched byproduct from a first pass can be processed a second time to create a higher purity rubber stream and a plastic-rich stream that can perhaps be re-circulated back into the process for plastic recovery.

The following examples describe methods, systems and devices to create a higher purity plastic flake mixture by enabling the removal of rubber, or a higher purity rubber stream.

EXAMPLES

The following examples demonstrate the effectiveness of inclined chute sorters for the separation of rubber from plastics.

Example 1

Inclined Chute Sorter Removing Rubber from WEEE

We processed a mixture of plastic-rich particles through two passes over inclined chute sorters. The particles were smaller than about 8 mm and were a mixture of primarily acrylonitrile-butadiene-styrene (ABS) and high impact polystyrene (HIPS) that had been recovered from waste electrical and electronic equipment (WEEE). The flake mixture fed to the first stage inclined chute sorter contained 0.44% rubber.

The inclined chute sorter was 60 cm in width and was fed at a rate of 1.3 metric tons per hour. The angle of the sliding chute was 60 degrees with respect to horizontal. The surface of the sorter was polycarbonate. Five rubber collection points were located along the inclined chute sorter, as shown in FIG. 4. The distance between the slide surface and the upper collection point ($y_1$) was adjusted to be 24 mm, and the distance between the slide surface and the lower collection point ($y_5$) was adjusted to be 38 mm.

The product from the first inclined chute sorter contained 0.34% rubber and the product after the second stage inclined chute sorter contained 0.28% rubber. The plastic lost to the inclined chute sorter rubber-rich streams accounted for 4.2% of the plastic in the feed. The rubber concentrations in the two rubber-rich streams were 4.2% and 3.3%, respectively.

Example 2

Inclined Chute Sorters in Series to Remove Rubber from ABS from ELV

We processed a mixture of plastic-rich particles through four passes over inclined chute sorters. The particles were smaller than about 8 mm and were primarily acrylonitrile-butadiene-styrene (ABS) that had been recovered from end of life vehicles (ELV). The flake mixture fed to the first stage inclined chute sorter contained 9% rubber.

Each inclined chute sorter was 90 cm in width and was fed at a rate of approximately 1 metric ton per hour. The angle of the sliding chutes was 60 degrees with respect to horizontal. The sliding surface of each sorter was glass. Six collection points were located along each inclined chute sorter. The distance between the slide surface and the upper collection point ($y_1$) was adjusted to be about 20 mm, and the distance between the slide surface and the lower collection point ($y_6$) was adjusted to be about 30 mm.

The product after the four slide sorters contained 1% rubber. About 4.2% of the plastic was lost to the inclined chute sorter rubber-rich streams. The rubber-rich streams each contained between 50% and 90% rubber.

Example 3

Inclined Chute Sorters to Create a Pure Rubber Stream from ELV

We processed a mixture containing both plastic and rubber over inclined chute sorters. The particles were smaller than about 8 mm and had been recovered from end of life vehicles (ELV). The flake mixture fed to the first stage inclined chute sorter contained approximately 27.7% rubber.

Each inclined chute sorter was 90 cm in width and was fed at a rate of approximately 1 metric ton per hour. The angle of the sliding chutes was 60 degrees with respect to horizontal. The surface of the each sorter was glass. Four collection points were located along the inclined chute sorter. The distance between the slide surface and the upper collection point was adjusted to be 25 mm, and the distance between the slide surface and the lower collection point was adjusted to be 55 mm.

The plastic-rich product after the inclined chute sorter contained 20.4% rubber. The rubber-rich product contained 95.9% rubber.

We further processed the rubber-rich stream through an additional pass with the same equipment settings to obtain a stream containing 98.9% rubber which accounted for 53.0% of the rubber available in the feed material.

Example 4

Inclined Chute Sorter with Collection Points at Different Distances from Inclined Chute's Sliding Surface (Anodized Aluminum)

We processed a mixture containing both plastic and rubber over inclined chute sorters. The plastics were primarily polyolefins. The mixture contained approximately 3% rubber. The particles were smaller than about 6 mm that had been recovered from end of life vehicles (ELV). The angle ($\alpha$) of the sliding chutes was 60 degrees with respect to horizontal. The surface of the sorter was made of anodized aluminum. Four collection points were located along the inclined chute sorter. The distance between the slide surface and the upper collection point ($y_1$) was adjusted to be 15, 20 or 25 mm. The distance between the slide surface and the lower collection point ($y_2$) was twice that of the distance between the slide surface and the upper collection point ($y_1$). The values of $y_2$ were adjusted to be 30, 40 and 50 mm.

Table 1 shows the fraction of plastic reporting to the plastic-rich product (plastic yield efficiency) and the fraction of rubber reporting to the rubber-rich product for three different distances between the upper collection point and slide surface ($y_1$). The fraction of rubber removed is higher when the distance is reduced. The loss of plastic is very low for all three settings.

TABLE 1

Plastic yield efficiency and fraction of rubber removed by inclined chute sorter processing ELV material with different distances between the collection points and an anodized aluminum slide surface

| Distances between the upper collection point and slide surface ($y_1$), mm | Plastic yield efficiency | Fraction of rubber reporting to the rubber-rich product |
|---|---|---|
| 15 | 99.7% | 0.133 |
| 20 | 99.8% | 0.072 |
| 25 | 99.8% | 0.076 |

Example 5

Inclined Chute Sorter with Collection Points at Different Distances from Inclined Chute's Sliding Surface (Glass)

We processed a mixture containing both plastic and rubber over inclined chute sorters. The plastics were primarily polyolefins. The mixture contained approximately 1.5% rubber. The particles were smaller than about 6 mm that had been recovered from end of life vehicles (ELV). The angle ($\alpha$) of the sliding chutes was 60 degrees with respect to horizontal. The surface of the each sorter was made of glass. Four collection points were located along the inclined chute sorter. The distance between the slide surface and the upper collection point ($y_1$) was adjusted to be 15, 20 or 25 mm. The distance between the slide surface and the lower collection point ($y_2$) was twice that of the distance between the slide surface and the upper collection point ($y_1$). The values of $y_2$ were adjusted to be 30, 40 and 50 mm.

Table 2 shows the fraction of plastic reporting to the plastic-rich product (plastic yield efficiency) and the fraction of rubber reporting to the rubber-rich product for three different distances between the upper collection point and slide surface ($y_1$). The fraction of rubber removed is higher when the distance is reduced. The loss of plastic is very low for all three settings.

TABLE 2

Plastic yield efficiency and fraction of rubber removed by inclined chute sorter processing ELV material with different distances between the collection points and a glass slide surface

| Distances between the upper collection point and slide surface ($y_1$), mm | Plastic yield efficiency | Fraction of rubber reporting to the rubber-rich product |
|---|---|---|
| 15 | 99.7% | 0.264 |
| 20 | 99.9% | 0.113 |
| 25 | 99.97% | 0.091 |

Example 6

Inclined Chute Sorter with Different Chute Surfaces

We processed a mixture containing both plastic and rubber over inclined chute sorters. The mixture was a rubber-rich stream that was combined from slide sorter rubber-rich streams that had been previously collected. The mixture contained approximately 18% rubber. The particles were smaller than about 8 mm that had been recovered from shredded toner cartridges (STC). The angle ($\alpha$) of the sliding chutes was 60 degrees with respect to horizontal. The surface of each sorter was made of either anodized aluminum or glass. Four collection points were located along the inclined chute sorter. The distance between the slide surface and the upper collection point ($y_1$) was adjusted to be 15, 20 or 25 mm. The distance between the slide surface and the lower collection point ($y_2$) was twice that of the distance between the slide surface and the upper collection point ($y_1$). The values of $y_2$ were adjusted to be 30, 40 and 50 mm.

Table 3 shows the fraction of rubber reporting to the rubber-rich product for three different distances between the upper collection point and slide surface ($y_1$). The fraction of rubber removed is higher when the distance is reduced. The loss of plastic is very low for all three settings and for both materials.

For this example, the glass surface seems slightly better for small values of $y_1$ and better for anodized aluminum for larger values of $y_1$. Both surfaces are very efficient, although we noted that the glass surface accumulated a charge that attracted fines. The anodized aluminum surface conducted charge and thus did not attract fines.

TABLE 3

Fraction of rubber removed by Inclined chute sorter processing STC material with different distances between the collection points and a different slide surfaces

| Distances between the upper collection point and slide surface ($y_1$), mm | Fraction of rubber reporting to the rubber-rich product | |
|---|---|---|
| | Glass surface | Anodized aluminum surface |
| 15 | 0.477 | 0.376 |
| 20 | 0.214 | 0.336 |
| 25 | 0.134 | 0.239 |

Other Embodiments

It is to be understood that, while the invention has been described herein in conjunction with a number of different aspects, the foregoing description of the various aspects is intended to illustrate and not limit the scope of the invention, which is defined by the scope of the appended claims. Other aspects, advantages, and modifications are within the scope of the following claims.

Disclosed are methods and apparatuses that can be used in conjunction with other methods and apparatuses. While certain methods and apparatuses are disclosed herein, and it is understood that combinations, subsets, interactions, groups, etc. of these methods and apparatuses are disclosed. That is, while specific reference to each various individual and collective combinations and permutations of these systems, apparatuses, and methods may not be explicitly disclosed, each is specifically contemplated and described herein. For example, if a particular method step is disclosed and discussed in one embodiment and other method steps are disclosed in other embodiments, each and every combination and permutation of the method steps are specifically contemplated unless specifically indicated to the contrary.

What is claimed is:

1. A method of separating a mixture of solid materials, the method comprising:
   supplying a stream of a mixture of solid materials to a stationary inclined surface, said mixture including a plurality of particles, the plurality of particles including rubber particles and plastic particles, wherein the particles of said mixture contacts the stationary inclined surface and travel downward along the surface due to gravitational force; and
   collecting a plurality of particles at one or more collection ports spaced from and located along the axis of the inclined surface, wherein the collected particles comprise a higher percentage of the rubber particles than said mixture due to a greater degree of bouncing of the rubber particles due to their higher friction compared with plastic particles,
   wherein a dampening device is positioned at the top of the stationary inclined surface to change the trajectories of at least some particles supplied to the stationary inclined surface, wherein the dampening device comprises fabric, coated fabric or a flexible plastic or rubber sheet.

2. The method of claim 1, wherein the plastic particles comprise plastic particles having a diameter of between 2 mm and 10 mm and a thickness of between 1 mm and 3 mm.

3. The method of claim 1, wherein the stationary inclined surface is angled at an angle of between 50 and 70 degrees with respect to horizontal.

4. The method of claim 1, wherein said mixture is fed to the stationary inclined surface by a vibratory feeder.

5. The method of claim 4, wherein the vibratory feeder is positioned relative to the stationary inclined surface such that said mixture falls less than 25 mm from the vibratory feed to the stationary inclined surface, wherein the vibratory feeder is positioned relative to the stationary inclined surface such that said mixture falls less than 10 mm from the vibratory feed to the stationary inclined surface.

6. The method of claim 4, wherein a first collection port is at least 15 cm from the vibratory feeder.

7. The method of claim 1, wherein the stationary inclined surface comprises glass, plastic, or anodized aluminum.

8. The method of claim 1, wherein the plurality of collected particles are collected at two or more collection ports spaced from and located along the axis of the inclined surface.

9. The method of claim 1, wherein the one or more collection ports are perpendicular to direction of sliding particles and at a slightly lesser angle than inclined surface with respect to horizontal.

10. The method of claim 1, further comprising adjusting a gap between the one or more collection ports before supplying said mixture.

11. The method of claim 1, wherein a majority of the particles in said mixture have a diameter of 25 mm or less.

12. The method of claim 1, wherein particles collected from a plurality of collection ports are combined into a single byproduct stream.

13. The method of claim 1, wherein the one or more collection ports are spaced from the stationary inclined surface at a distance of between 10 mm and 100 mm.

14. The method of claim 1, wherein a plurality of collection ports are in a single plane and are spaced equally along an axis of a collection framework, wherein a plurality of collection ports are equally spaced from the stationary inclined surface.

15. The method of claim 1, wherein a plurality of collection ports are spaced at different distances from the stationary inclined surface, wherein a first collection port is located above a second collection port, the first collection port being spaced closer to the stationary inclined surface than the second collection port.

16. A material sorting apparatus comprising:
   a stationary inclined surface;
   a feeder adapted to supply a stream of particles to the stationary inclined surface such that the particles tumble down the stationary inclined surface;
   a plurality of collection ports spaced from and located along the axis of the inclined surface, the plurality of collection ports positioned to collect particles that bounce away from the stationary inclined surface; and
   a dampening device is positioned at the top of the stationary inclined surface to change trajectories of at least some of the particles supplied from the feeder to the stationary inclined surface, the dampening device comprising fabric, coated fabric or a flexible plastic or rubber sheet.

17. The apparatus of claim 16, wherein the feeder is positioned relative to the stationary inclined surface such that the particles fall less than 25 mm from the feed to the stationary inclined surface, wherein a first collection port is at least 15 cm from the feeder.

18. The apparatus of claim 16, a gap between at least one of the collection ports and the stationary inclined surface is adjustable, wherein distances of a collection framework at upper and lower ends of the slide sorter can be adjusted independently.

19. The apparatus of claim 16, wherein the plurality of collection ports include at least two collection ports that are spaced at different distances from the stationary inclined surface, wherein a first collection port is located above a second collection port, the first collection port being spaced closer to the stationary inclined surface than the second collection port.

* * * * *